US012729270B2

(12) United States Patent
Bechgaard et al.

(10) Patent No.: US 12,729,270 B2
(45) Date of Patent: Sep. 8, 2026

(54) BIO-BASED PLASTICISER FOR RESINS AND BLENDS CONTAINING SAID PLASTICISER

(71) Applicant: BIO BOND APS, Aarhus C (DK)

(72) Inventors: Tobias Kjær Bechgaard, Skørping (DK); Camilla Borregaard Stride, Svenstrup (DK); Martin Jensen, Aalborg (DK)

(73) Assignee: Teknologiselskabet af 2025 ApS, Hojbjerg (DK)

( * ) Notice: Subject to any disclaimer, the term of this patent is extended or adjusted under 35 U.S.C. 154(b) by 578 days.

(21) Appl. No.: 18/015,334

(22) PCT Filed: Jul. 6, 2021

(86) PCT No.: PCT/EP2021/025244

§ 371 (c)(1),
(2) Date: Jan. 10, 2023

(87) PCT Pub. No.: WO2022/017639

PCT Pub. Date: Jan. 27, 2022

(65) Prior Publication Data

US 2024/0270900 A1 Aug. 15, 2024

(30) Foreign Application Priority Data

Jul. 20, 2020 (EP) .................................... 20020330

(51) Int. Cl.

*C08G 63/60* (2006.01)
*C08G 63/66* (2006.01)
*C08G 63/685* (2006.01)
*C08L 67/04* (2006.01)

(52) U.S. Cl.

CPC ............ *C08G 63/60* (2013.01); *C08G 63/66* (2013.01); *C08G 63/6856* (2013.01); *C08L 67/04* (2013.01); *C08K 2201/018* (2013.01); *C08L 2201/06* (2013.01)

(58) Field of Classification Search

None
See application file for complete search history.

(56) References Cited

U.S. PATENT DOCUMENTS

| | | | | |
|---|---|---|---|---|
| 9,139,689 | B1 * | 9/2015 | Flynn | C08G 63/676 |
| 2007/0203275 | A1 | 8/2007 | Kikuchi et al. | |
| 2009/0253871 | A1 | 10/2009 | Flynn et al. | |
| 2013/0108732 | A1 | 5/2013 | Neergaard | |
| 2017/0066901 | A1 | 3/2017 | Yang et al. | |
| 2017/0267905 | A1 | 9/2017 | Nakamura et al. | |

FOREIGN PATENT DOCUMENTS

| | | |
|---|---|---|
| CN | 103524721 | 1/2014 |
| CN | 105085883 | 11/2015 |
| CN | 105175697 | 12/2015 |
| CN | 107022067 | 8/2017 |
| CN | 109796626 | 5/2019 |
| EP | 1564234 A1 | 8/2005 |
| EP | 2202267 | 6/2010 |
| EP | 2840113 | 2/2015 |
| JP | 024611 | 1/1990 |
| WO | 2013119450 | 8/2013 |
| WO | 2013142534 | 9/2013 |
| WO | 2015142584 | 9/2015 |

* cited by examiner

*Primary Examiner* — Jeffrey D Washville
(74) *Attorney, Agent, or Firm* — Rivka Friedman

(57) ABSTRACT

The present invention relates to a family of preferably bio-based plasticisers and resins containing said plasticisers. The disclosed plasticisers belong to the poly (ester ether) family. Resins containing the plasticisers exhibit a broad range of applicability in terms of suitable processing techniques and utilisation for final products.

17 Claims, 1 Drawing Sheet

OH OH

O R O n

Dicarboxylic acid

HO R OH n

Dialcohol

BIO-BASED PLASTICISER FOR RESINS AND BLENDS CONTAINING SAID PLASTICISER

FIELD OF THE INVENTION

The present invention relates to a group of plasticisers that at are least partly and preferably fully biobased and degradable in nature and that are suitable for mixing with other resins to modify their mechanical, physical and chemical performance, in particular improving their elongation at break, flexibility, impact strength and fracture toughness. The invention also relates to resin blends comprising said plasticisers and products manufactured from said blends.

BACKGROUND OF THE INVENTION

Polymers are an integrated part of daily life products and their application areas continue to increase. Currently, polymers are almost exclusively produced from fossil sources, which creates two environmental issues. First, after end of life, incineration of polymers releases $CO_2$, which contributes to increasing atmospheric $CO_2$ levels. Second, most of these fossil-based polymers lack biodegradability and thus if the polymers are not collected for incineration or recycling, they end up in nature as waste polluting oceans, forests, and recreational areas. Further, polymers can comprise molecules with a harmful effect on human health such as endocrine disruptors as bisphenols and phthalates. Avoiding or reducing these effects on the environment and human health is desirable.

To combat the environmental issues of polymers, bio-based and biodegradable polymers have gradually been introduced during the last decade. Some of the introduced polymers aim to mimic the chemical structure of fossil-based polymers such as bio-based polyethylene whereas other polymers have structures not found in commercially available polymers derived from fossil sources. Examples of such polymers include poly lactic acid, also known as poly lactide and PLA, poly hydroxyalkanoates, poly glycolide, and lignin-based polymers. The structural difference to fossil-based polymers leads to different properties of the polymers as exemplified by PLA that lacks the toughness, impact strength, and elongation at break seen among many fossil-based polymers. This implies that PLA cannot be used as a direct substitute for fossil-based polymers in many applications, which limits the introduction of PLA and other bio-based resins into said applications.

A cost-effective and scalable approach to modify the properties of a resin is melt blending in which the resin is blended with one or more polymers, oligomers or monomers, also broadly known as modifiers, to yield a new resin taking characteristics of each of its constituents. The efficiency of the introduced substance improves when the blended components are miscible. Thus, an advantageous approach to modify the properties of resins is to melt blend them with compounds that are soluble in the resin.

Another advantage of using miscible modifiers instead of immiscible alternatives is the effect on the migration of modifiers from the resin matrix to the specimen exterior. The migration can be decreased by creating a strong compatibility between resin and modifier and can be further enhanced by increasing the molecular weight of the modifiers, as the migration speed is negatively related to molecular weight.

The application area of bio-based and biodegradable resins can advantageously be expanded by melt blending these resins with compounds capable of increasing the elongation at break, flexibility, impact strength, toughness, resilience, melting point, glass transition temperature and/or other properties. To maintain the environmental benefit of the bio-based resins, the compounds said resins are blended with should preferably be both bio-based and biodegradable and free of substances harmful to humans, plants, and wild-life.

US2017066901 discloses a polyester plasticizer made from ketoglutaric acid and a dialcohol. The exemplified polyester has a molecular weight of 1893 g/mol. US2007203275 discloses mono- and diesters made from propanediol and a monoacid, which causes the synthesized esters to be of low molecular weight. WO2015142584 discloses plasticising diesters made from side streams from bioethanol production and since the plasticizer is a diester, the molecular weight is low. EP2202267 discloses a group of diesters suitable for plasticizing aliphatic polyester resins. Low molecular weights of the plasticiser can be disadvantageous since this can lead to modifier migration in the blended resin.

EP1564234A1 describes a plasticizer prepared from 2-methyl-1,3-propanediol, 3-methyl-1,5-pentanediol, adipic acid, and a chain terminator in the form of a monovalent alcohol or acid. Additional aliphatic diol and diacids are present in some embodiments. The plasticiser is prepared for chlorine-containing resins and it is claimed that if the plasticiser obtains a molecular weight above 5000 g/mol its flexibility will deteriorate.

WO2013142534 discloses plasticising esters synthesized from either furoic acid, furfural, or furfuryl alcohol and a carboxylic acid or alcohol. In CN109796626, a plasticizer is prepared from furan dicarboxylic acid and polyethylene glycol or polypropylene glycol. As an aromatic structure, furans are less likely to migrate than aliphatic compounds of similar size, but aromatics are rigid and therefore not well suited for providing toughness and elongation to resins.

US2009253871 discloses a copolymer plasticiser consisting of a compatibilising unit and a plasticising unit. The plasticising unit is made from alcohol, diacid, and an aromatic structure and according to the above, the addition of aromatic structures is disadvantageous for the plasticizing effect of the unit. Further, due to the need of a compatibilising unit, a larger amount of the copolymer is needed to obtain the desired plasticizing effect compared to plasticisers that are compatible with the resin.

WO2013/119450 prepares a copolymer plasticiser for PLA consisting of a plasticising unit prepared from glycerol, maleic anhydride and di(ethylene glycol) and a compatibilising unit prepared from lactic acid or lactide.

CN103524721 describes the production of plasticisers from bioethanol waste streams containing glycol, polyol, and polysaccharides to which polyacids are added to yield a yellow-brown oil. Owing to the variation in the bioethanol side stream, the chemical structure of the plasticizer is hard to control and a plasticizer with colour is likely obtained, which is disadvantageous for some applications.

CN105175697 discloses a two-step procedure to prepare a plasticiser for polyester resins. In the first step, vegetable oil and glycol are reacted in molar ratio of 1:2-2.5 for 2-8 hours to yield a glyceride intermediate. In the second step, the intermediate is reacted with a diacid or acid anhydride for 6-12 h upon which a monoalcohol is added. Sebacic acid is exemplified as a suitable diacid. Vegetable oils commonly consist of fatty acids with carbon chains with a length of 8-16 units and sebacic acid has 8 carbon atoms, which implies that the synthesized molecule has long carbon segments that have limited solubility in polyester resin with shorter carbon linkages between the ester bonds. Further the two-step procedure and long reaction time is disadvantageous.

CN105085883 also uses a two-step procedure by initially preparing two prepolymers each consisting of adipic acid and a dialcohol and the prepolymers are later reacted to yield a plasticizer. In addition to long reaction time, a molar excess of 10-30% of adipic acid to alcohol is used, which limits the molecular weight.

CN107022067 discloses an isosorbide polyetherester prepared via a two-step reaction in which isosorbide is initially reacted with a dicarboxylic acid. Upon completion of the reaction between the isosorbide and dicarboxylic acid, a molecule containing an ether group and a single hydroxyl group is added to yield molecule suitable for plasticizing PLA.

EP2840113 describes a plasticizer that is ester based and contains at least one of the following ethers in a concentration not larger than 20% by weight: bis(2-ethylhexyl) ether, butyl(2-ethylhexyl) ether, and dibutyl ether. The plasticisers are molecules of low molecular weight since monoalcohols are used as raw material to yield the ethers.

JPH024611 prepares a plasticizer for PLA by reaction of lactic acid and 2-10% by weight of PEG. Although the use of lactic acid promotes miscibility with PLA, polymerisation of lactic acid gives PLA which is brittle and since the plasticizer consists of at least 90% by weight of lactic acid, the efficiency of the plasticizer is low.

US2017/0267905 discloses antistatic agents for thermoplastic resins and in example 8 it is disclosed that said antistatic agent can be prepared from a cycloaliphatic dialcohol, cycloaliphatic dicarboxylic acid, polyethylene glycol and citric acid.

US2013/0108732 discloses a polyester for use in chewing gum. The polyester is created from at least one dicarboxylic acid, at least one diol and at least one compound having at least three groups capable of ester formation. In examples it is disclosed that diethylene glycol can be used as diol.

SUMMARY OF THE INVENTION

The present invention relates to a group of plasticisers that can be used to modify the mechanical, physical, and chemical properties of resins, in particular polyester resins. The modification particularly relates to increasing elongation at break, fracture toughness, and impact strength. The invention also relates to resins containing said plasticiser. The plasticisers are preferably degradable in nature and are preferably at least partly derived from renewable sources.

As used herein, the term poly (lactic acid), abbreviated PLA, refers to any of the isomeric states of poly (L-lactic acid), poly (D-lactic acid) and poly (L, D-lactic acid) or mixtures hereof. The term mixtures also include both random mixing of any of the isomeric states and scenarios where one or a mixture is coated with another or mixture of isomeric states.

As used herein, the term monomer refers to a molecule that can undergo polymerisation. A monomer can react with an identical or different monomer molecule to yield another molecule that can also be termed a monomer.

For molecules with one or more unsaturated carbon double bonds, the name of the molecules refers to both cis and trans enantiomers and combinations hereof unless otherwise specified.

For molecules containing one or more chiral carbon atoms, the name of the molecule refers to both L and D enantiomers and combinations hereof unless otherwise specified.

Multifunctional alcohol is a molecule containing at least two hydroxyl groups and at least one more reactive group such a carboxyl, hydroxyl, amine, anhydride, isocyanate, epoxy and unsaturated carbon bonds. Hence, examples of multifunctional alcohols are triols and glyceric acid.

Multifunctional carboxylic acid is a molecule containing at least two carboxyl groups and at least one more reactive group such a carboxyl, hydroxyl, amine, anhydride, isocyanate, epoxy and unsaturated carbon bonds. Hence, examples of multifunctional carboxylic acids include propane 1,2,3-tricarboxylic acid and malic acid.

As used herein, molar masses are measured by means of gel permeation chromatography (GPC) using polystyrene as standard. The choice of eluent in the GPC measurement relies on the chemical composition of the analysed substance as solubility of the substance in the eluent is required, but tetrahydrofuran and chloroform (trichloromethane) are preferred eluent choices. Various columns can be used in the GPC measurement varying in particle type and size. The use of standards such as polystyrene for calibrating between retention time and molar mass corrects for any differences in the retention time introduced by varying the column material and size of the column material. The skilled person knows to select a column with a resolving range matching the molar mass of the analysed substance, with large particle size suitable for high molar mass substances and small particle sizes suitable for low molar mass substances. Unless otherwise specified, molecular mass refers to number average molecular mass. As known to the person skilled in the art, the terms molar mass and molecular mass are used interchangeably. Similarly, the words mass and weight are used interchangeably.

The invention relates to poly (ester ethers) that is molecules containing both ester and ether linkages in its chemical backbone and the backbone has a length that classifies the molecule as a polymer. In this invention molecules with a number average molecular mass below 1100 g/mol are determined monomers or oligomers and therefore the polymers of the present invention have a molecular mass of at least 1500 g/mol. As the molar mass increases, the molecular mobility of the polymer chain decreases, and thus greater molar masses are advantageous for avoiding migration or bleeding of the plasticiser. This is advantageous when the plasticiser is blended with other resins for ensuring the stability of the blended resin over time. Further, by increasing the molecular mass of the plasticiser, the volatility of the plasticiser reduces. Preferably, the molar mass is at least 2000 g/mol, more preferably at least 5000 g/mol, even more preferably at least 8000 g/mol and most preferably at least 10000 g/mol.

Ester linkages are often created through a condensation reaction between an alcohol and a carboxylic acid group but can also be established in a polymer backbone through ring opening of a cyclic molecule. In preferred embodiments of the invention, ester linkages in the polymer backbone are created through reaction of dialcohols and dicarboxylic acids and preferably a multifunctional alcohol or carboxylic acid, i.e., a molecule containing at least 3 alcohol and/or carboxylic acid groups, in a concentration below 20% by weight of the plasticiser, preferably below 15% by weight, more preferably below 10% by weight and most preferably below 5% by weight. Preferably, the dialcohols and dicarboxylic acids are linear unbranched molecules and preferably with the alcohol and carboxylic acid groups positioned at the end of the molecule (FIG. 1). Preferably, the multifunctional alcohol or carboxylic acid is a multifunctional alcohol. The length of the carbon chain between the reactive end groups is important to the mechanical properties of the plasticiser and its miscibility with polyester resin.

A long carbon segment improves the flexibility of the resulting polymer and thereby its ability to act as a plasticiser, but on the other hand reduces the miscibility with polyester resins, in particular with PLA and poly glycolide. The ratio between carbon and oxygen atoms should not deviate substantially from that of the resin the plasticiser is blended with when miscibility is required. Therefore, the number of carbon atoms in the dialcohols and dicarboxylic acids is 2-20 (n in FIG. 1 equals 0-18), preferably 2-15 and most preferably 3-10. The plasticiser can consist of a plurality of dialcohols and dicarboxylic acids in order to obtain the desired balance between plasticising effect and miscibility. In case the plasticiser consists of a plurality of dialcohols and dicarboxylic acids, the number of carbon atoms is calculated as a weighted average based on the mass of each dialcohol and dicarboxylic acid and the number of carbon atoms in each of them. When the plasticiser consists of a plurality of dialcohols and diacids, the average number of carbon atoms is preferably 3-8.5, preferably 4.1-8.

BRIEF DESCRIPTION OF THE DRAWING

FIG. 1: Schematic drawing of dicarboxylic acid and dialchol.

DETAILED DESCRIPTION OF PREFERRED EMBODIMENTS

In various embodiments of the invention both dicarboxylic acids and dialcohols are saturated to avoid extensive cross linking and oxidation of the polymer. Advantageous dicarboxylic acids are malonic acid, succinic acid, adipic acid, suberic acid, azaleic acid, sebacic acid, 2-methylsuccinic acid and ketoglutaric acid. Advantageous alcohols are 1,2-ethanediol, 1,3-propanediol, 1,2 propanediol, 1,4-butanediol, 1,3-butanediol, 2,3-butanediol, 1,5-heptanediol, 1,6-hexanediol, 1,8-octanediol, 1,9-nonanediol, and 1,10-decanediol.

The multifunctional alcohol or carboxylic acid can be a plurality of molecules and can in addition to either an alcohol or carboxylic acid group also comprise an anhydride or amine group. Examples of suitable molecules include malic acid, citric acid, tartaric acid, glucose, fructose, sucrose, glycerol, xylitol, sorbitol, glyceric acid, and suitable amino acids such as arginine, lysine, asparagine, and serine.

In various aspects of the invention, part of the dialcohol is replaced by a diamine or a molecule containing one primary amine group and a carboxylic acid or alcohol group to introduce amide bonds into the plasticiser. Preferably the dialcohol substitution percentage is below 10% by weight, more preferably below 7% by weight and most preferably below 5% by weight. The replacement of ester with amide linkages in the plasticiser modifies the mechanical properties of the plasticiser and increases the miscibility with resins comprising amide bonds. Preferred molecules for substitution of dialcohol comprise alanine, isoleucinemethionine, phenylalanine, glycine, valine, isophoronediamine, 1,3-propanediamin, 1,4-butanediamiane, 1,5-pentanediamine, 1,6-hexanediamine, 1,8-octanediamine, 1,9-nonanediamine, 1,10-decanediamine, aminomethanol, ethanolamine, propanolamine, aminomethyl propanol, and valinol.

In various embodiments of the invention, the plurality of monomers used to synthesise the plasticiser is free of molecules with only a single reactive group such as hydroxyl and carboxylic acid groups since inclusions of these reduce the molecular weight of the plasticiser.

In addition to ester linkages, the plasticiser of the present invention also comprises ether bonds as ether bonds can have advantageous plasticising effects. In the present invention, the ether and ester bonds must be present in the same molecular chain rather than in two separate molecular networks. To achieve this, either a molecule with at least one ether moiety and reactive groups towards alcohol and/or carboxylic acids or a molecule capable of forming an ether upon reaction with the dialcohols during the synthesis of the plasticiser is required. An ether group can be formed upon reaction of two alcohol groups or an alcohol and an alkyl halide under alkaline conditions.

In preferred embodiments of the invention, the ether bonds in the polymer backbone of the plasticiser is created by using a molecule containing at least one ether group and at least two chemical groups that can undergo reaction with alcohols or carboxylic acids. Preferably, said at least two chemical groups are alcohol, carboxylic acid, or amine groups. Advantageously, the amount of molecules containing ether groups is 10-50% by weight, preferably 15-40% by weight, more preferably 20-35% by weight and most preferably 21-33% by weight. In various embodiments, when the ether moieties of the plasticiser are created during the synthesis of the plasticiser, the content of the molecules forming the ether groups is 10-50% by weight, preferably 15-40% by weight, more preferably 20-35% by weight, and most preferably 21-33% by weight. In preferred embodiments of the invention, the molecule containing at least one ether group has a number average molecular weight of at least 140 g/mol, more preferably at least 200 g/mol.

In various embodiments of the invention, the amount of aromatic molecules is below 20% by weight, more preferably below 10% by weight, even more preferably below 5% by weight, and most preferably the plasticiser of the invention is free of aromatic moieties since these provide stiffness and brittleness to polymer structures. In other embodiments of the invention, the amount of cycloaliphatic molecules is below 50% by weight, preferably 20% by weight, more preferably below 10% by weight, even more preferably below 5% by weight, and most preferably below 2% by weight of cycloaliphatic compounds. In further embodiments of the invention, the sum of aromatic and cycloaliphatic molecules is below 50% by, preferably below 20% by weight, more preferably below 10% by weight, even more preferably below 5% by weight. Both aromatic and cycloaliphatic moieties increase the glass transition temperature of the plasticiser, which can reduce the plasticising effect of the plasticiser.

To obtain a polymer with molecular weight that is above the threshold of migration when blended with other resins, the stoichiometry between the reactive groups is important. Preferably, no reactive groups are present in a molar excess of not more than 10% relative to the chemical groups it can undergo reaction with, preferably not more than 5%, more preferably not more than 2%, and most preferably not more than 1%.

To reduce the carbon footprint of the plasticiser, said plasticiser is at least partly produced from renewable materials. In order to introduce renewable content to the plasticiser, molecules fully or partly derived from renewable materials can be employed for synthesis of the plasticiser. In advantageous embodiments of the invention, the plasticiser is produced from at least 40% by weight of renewable materials, preferably at least 60% by weight, more preferably at least 70% by weight, even more preferably at least 80% by weight, and most preferably 100% by weight of renewable materials.

Renewable materials, as example according to the Rutgers University Center for Sustainable Materials at The State University of New Jersey (USA), are to be understood as materials that do not use up non-renewable resources. Renewable materials are those which can be manufactured or generated quickly enough to keep pace with how fast they are used up. Renewable materials can be made from natural products or may be synthetically produced, and renewable materials may include recycled products.

In advantageous embodiments of the invention, the plasticiser is prepared through bulk polymerisation, which means no solvents are used. In bulk polymerisation, the raw materials are added to the reaction vessel and during stirring and heating, the raw materials melt and dissolve to form a homogeneous mixture. Through bulk polymerisation, the use of solvents is omitted which contributes to cost effectiveness, reduced health risk, and lower environmental footprint.

To increase the reaction rate, a catalyst can be added to the raw materials used in the preparation of the plasticiser. Acids with a $pK_a$ value lower than the carboxylic acids used in the preparation of the plasticiser are suitable. Acids without a carboxylic acid group, especially inorganic acids, are preferred since they will not be incorporated into the polymer network forming the plasticiser. Other suitable catalysts include zinc acetate, magnesium acetate, calcium acetate, and tin compounds.

The invention also relates to resins comprising the plasticiser disclosed in this invention. The plasticiser can be mixed into the resin by various approaches such as extrusion. Mixes in which the plasticiser has the concentration of the final compound, that can be used for various purposes such as injection moulding, thermoforming and fibre spinning, can be prepared as well as concentrates of a resin and the plasticiser that can be used as masterbatches. For final compounds, the concentration of the plasticiser is between 1 and 25% by weight, preferably 2-20% by weight, and most preferably 3-15% by weight. For concentrates, the concentration of the plasticiser is 25-65% by weight, preferably 30-60% by weight, and most preferably 35-60% by weight. In preferred embodiments of the invention, at least half of the weight of the resin or resins that the plasticiser is mixed into is PLA.

It is advantageous to have miscibility between the plasticiser and the resin (s) it is blended with since inclusion of a compatibilising unit in the plasticiser molecule can be omitted. By omitting a compatibilising unit meanwhile having miscibility between the plasticiser and the resin (s) it is blended with, less plasticiser is needed to obtain the desired effect. To characterise the miscibility, a differential scanning calorimetry measurement can be performed. If the blended resin only contains one glass transition temperature and/or melting point the polymers are miscible. In advantageous embodiments of the invention, a blend of the plasticiser of the present invention with PLA in plasticiser concentrations up to 5% by weight is miscible, preferably in plasticiser concentrations up to 10% by weight, more preferably in plasticiser concentrations up to 15% by weight, even more preferably in plasticiser concentrations up to 20% by weight, and most preferably in plasticiser concentrations up to 30% by weight. In various embodiments of the invention, the same concentrations of miscibility apply to poly glycolide, poly butylene succinate, and poly hydroxyalkanoates.

In various embodiments of the invention, the plasticiser or resin containing the plasticiser is dyed. The selection of the molecules in the dye composition is based on the desired colour and appearance such as gloss of the dye. Preferably the selected dye is free of petroleum derived content, which can be obtained by using natural dyes, synthetic dyes prepared from renewable materials, and minerals. Examples of natural dyes include indigo, madder, weld, cutch, safflower, turmeric, barberry roots, and bark, wood from *Caesalpinia sappan*, marigold oak gall, lawsone, lapachol, juglone, alkanan, alizarin, morindadiol, soranjidiol, purpurin, laccaic acid, kermesic acid, carminic acid, carbon black chalcone, and bixin. Suitable minerals include but is not limited to titania, iron oxides, iron hydroxides, copper hydroxides, organic copper complexes titania coated mica, zinc ferrite, and lapis lazuli.

Another property important for certain polymer applications is UV stability. For resin compositions where inherent UV stability is below the required level, the UV stability can be increased by adding one or more antioxidants or UV absorbers to the resin composition. To improve the UV stability hindered amine light stabilisers can be added and suitable molecules include bis(1,2,2,6,6-pentamethyl-4-piperidyl) sebacate and methyl 1,2,2,6,6-pentamethyl-4-piperidyl sebacate.

In various aspects of the invention, resins containing the plasticiser also comprise fillers that can be both organic and inorganic. Examples of suitable organic fillers are natural fibres such as flax, hemp, wood, jute, kenaf, bamboo, and natural seeds from sources such as flax, grape, sunflower, and rape. Inorganic fillers are preferably naturally occurring minerals and synthetic structures that can enter biological cycles. Examples of such inorganic fillers are silica, calcium sulphate, hydrated forms of calcium sulphate, calcium carbonate, hydroxyapatite, talc, sand, granite, stone, aluminium oxides, aluminium hydroxides, and phosphates.

Resin compositions disclosed in various embodiments can be combined to yield properties that are unattainable by using a only a single group of aspects of the invention. As an example, the plasticiser can be adapted towards an amide resin containing aromatic moieties, by including aromatic molecules in the synthesis of the plasticiser and by substituting part of the dialcohol with a compound containing at least one primary amine group and at least one another group reactive towards at least one of the reactive groups found in the plasticiser constituents. Another example of combination of embodiments is a plasticiser containing both aromatic and cycloaliphatic structures.

Specimen comprising the plasticiser and resins containing the plasticiser of the present invention can be manufactured using various processing techniques such as injection moulding, fibre spinning, yarn spinning, blow moulding, extrusion, and thermoforming. The present invention also relates to products manufactured from resins containing the plasticiser of the present invention. Resins containing the plasticiser of the present invention can be used to substitute various petroleum-based polymers such as poly ethylene (PE), poly propylene (PP), poly ethylene terephthalate (PET), poly butylene terephthalate (PBT), and acrylonitrile butadiene styrene (ABS).

Polymeric blends containing the plasticiser such as a melt blended resin of PLA can be used to produce various parts by means of injection moulding. Injection moulding is used to produce a plurality of products and as exemplified, melt blended resins comprising the plasticiser of this invention can be used to substitute fossil-based polymers such as PE, PP, PET, PBT, and ABS to create injection moulded products. Said injection moulded products can be applied for various purposes among others, furniture, toys, packaging, buttons and mobile phone covers.

In various aspects of the invention, resins comprising the plasticiser of the present invention are used to produce bags and films. Bags and films are commonly produced by means of blowing or casting using PE and PP as raw material. Particularly advantageous resins for creation of bags and films comprise PLA and the plasticiser of the present invention.

In various embodiments of the invention, blends comprising the plasticiser of the invention and other polymers such as PLA, poly glycolide, and poly hydroxyalkanoates are used to spin fibres or yarns for preparation of textiles in both woven and knitted form. Fibres are normally spun into a yarn that is later woven or knitted into a fabric whereas multifilament yarns can be directly prepared into a fabric by means of weaving or knitting. The textiles are particularly advantageous for apparel, shoes, clothing and other applications involving contact with human skin.

In a plurality of aspects of the invention, polymer blends comprising the plasticiser of the invention is used for preparation of both mono-component and bi-component staple fibres. A bi-component fibre is a fibre with a core of a high melting point coated with a sheath that is constituted by another polymer type that has a lower melting point than the core. Resins, particularly PLA, comprising the plasticiser of the invention can be used as both sheath and core layer of bi-component fibres. Staple fibres are used for preparing non-woven fabrics that are applicable for various products such as diapers, feminine hygiene pads, cigarette filters, tissues, facial masks, wet wipes, shopping bags and polishing and cleaning cloths.

In various embodiments of the invention, the plasticiser of the present invention, is used as an initiator for ring opening polymerisation of a cyclic monomer onto the plasticiser. Due to the monomers used in the preparation of the plasticiser, it comprises hydroxyl and carboxyl ending groups. Such groups can initiate ring opening of cyclic monomers with a certain polarity such as lactones, lactames, lactide and glycolide. Upon ring opening, the molecular chain of the monomer grows from the initiating group creating a block polymer with the plasticiser forming the core of the block polymer.

The present invention will be described with examples. While the examples illustrate the invention, it is not limited thereto.

EXAMPLE 1

A round bottomed flask equipped with a stirrer, a reflux condenser, and a pressure gauge is placed in an oil bath at 150° C. 0.2 mol succinic acid, 0.12 mol butanediol, 0.02 mol citric acid, 0.1 mol PEG-200, and 0.03 mol hydrochloric acid are allowed to react for 3 h under conditions of reduced pressure below 5000 Pa.

EXAMPLE 2

A round bottomed flask equipped with a stirrer is placed in an oil bath at 140° C. and 0.12 mol malonic acid, 0.12 mol glutaric acid, 0.2 mol butanediol, 0.15 mol 1,3-propanediol, 0.02 mol malic acid, 0.1 mol O,O'-oxydiethylene-diglycolic acid, and 0.03 mol sulphuric acid are allowed to react for 4 h under conditions of reduced pressure below 15.000 Pa.

EXAMPLE 3

A round bottomed flask equipped with a stirrer, a reflux condenser, and a pressure gauge is placed in an oil bath at 130° C. 0.2 mol adipic acid, 0.1 mol ethanediol, 0.15 mol lysine, 0.1 mol citric acid, 0.1 mol O,O'-oxydiethylene-diglycolic acid, 0.05 mol Jeffamine D-230 (polyoxypropylene diamine) and 0.03 mol phosphoric acid are allowed to react for 3 h under conditions of reduced pressure below 10.000 Pa.

EXAMPLE 4

10 g of the plasticiser of example 1 is in an extruder mixed with 40 g of PLA and extruded into pellets.

EXAMPLE 5

A round bottomed flask is placed in an oil bath at 170° C. and 10 g of the plasticiser of example 3, 90 g lactide and 0.1 mg stannous octoate are added to the flask. The mixture is allowed to react for 2 h.

EXAMPLE 6

A round bottomed flask equipped with a magnetic stirrer is placed in a silicone oil bath at 170° C. and 15.6 g (0.1 mol) 2,5-furandicarboxylic acid, 5.9 g (0.05 mol) succinic acid and 11.4 g (0.15 mol) 1,3-propanediol are added. When the chemicals have melted, 50 mg 8 mol/L sulphuric acid is added. The mixture is allowed to react for 3 h under atmospheric pressure. Subsequently, 30 g of the plasticizer of example 3 is added to the flask and the pressure is reduced to a value not higher than 10.000 Pa.

The invention claimed is:

1. A plasticiser having a number average molecular weight of at least 1500 g/mol, the plasticiser comprising the following:

a. dicarboxylic acids and dialcohols, b. one of a multifunctional alcohol or a carboxylic acid in a concentration below 20% by weight, c. a molecule with at least one ether moiety and reactive groups towards one of alcohols or carboxylic acids or a molecule capable of forming an ether upon reaction with the dialcohols, wherein the number average molecular weight of the molecule with at least one ether moiety and reactive groups towards one of alcohols or carboxylic acids is at least 140 g/mol and wherein the amount of cycloaliphatic molecules is below 50% by weight.

2. The plasticiser according to claim 1, wherein the molar mass is at least 5000 g/mol.

3. The plasticiser according to claim 1, wherein the one of the multifunctional alcohol or the carboxylic acid is present in a concentration below 10% by weight.

4. The plasticiser according to claim 1, wherein the multifunctional alcohol or carboxylic acid in addition to comprising one of an alcohol or a carboxylic acid group also comprises an anhydride or amine group.

5. The plasticiser according to claim 1, wherein the molecule with at least one ether moiety and reactive groups towards one of alcohol and carboxylic acids or a molecule capable of forming an ether upon reaction with the dialcohols is present in a concentration of 10-50% by weight.

6. The plasticiser according to claim 1, wherein the amount of aromatic molecules is below 20% by weight.

7. The plasticiser according to claim 1, wherein the amount of cycloaliphatic molecules is below 20% by weight.

8. The plasticiser according to claim 1, wherein a percentage of the alcohol groups in the monomers is substituted for amino groups and wherein the percentage is below 10% by weight.

9. The plasticiser according to claim 1, wherein part of the dialcohol is replaced by a diamine or a molecule containing one primary amine group and one of a carboxylic acid or an alcohol group to introduce amide bonds into the plasticiser, and wherein molecules for substitution of dialcohol consisting of alanine, isoleucine, methionine, phenylalanine, glycine, valine, isophoronediamine, 1,3-propanediamin, 1,4-butanediamiane, 1,5-pentanediamine, 1,6-hexanediamine, 1,8-octanediamine, 1,9-nonanediamine, 1,10-decanediamine, aminomethanol, ethanolamine, propanolamine, aminomethyl propanol, and valinol.

10. The plasticiser according to claim 1, wherein the molecules used to produce said plasticiser is derived from at least 40% by weight of renewable materials.

11. The plasticiser according to claim 1, wherein the molar mass is at least 10,000 g/mol.

12. The plasticiser according to claim 1, wherein the one of the multifunctional alcohol or the carboxylic acid is present in a concentration below 5% by weight.

13. The plasticiser according to claim 1, wherein the molecule with at least one ether moiety and reactive groups towards one of alcohol and carboxylic acids or a molecule capable of forming an ether upon reaction with the dialcohols is present in a concentration of 20-35% by weight.

14. The plasticiser according to claim 1, wherein the plasticiser is free of aromatic moieties.

15. The plasticiser according to claim 1, wherein the amount of cycloaliphatic molecules is below 10% by weight.

16. The plasticiser according to claim 1, wherein the molecules used to produce said plasticiser is derived from at least 60% by weight of renewable materials.

17. The plasticiser according to claim 1, wherein the molecules used to produce said plasticiser is derived from at least 80% by weight of renewable materials.

* * * * *